United States Patent
Nonaka et al.

(10) Patent No.: US 8,320,736 B2
(45) Date of Patent: Nov. 27, 2012

(54) REPRODUCTION DEVICE, REPRODUCTION METHOD, AND REPRODUCTION PROGRAM

(75) Inventors: Masao Nonaka, Osaka (JP); Motoji Ohmori, Osaka (JP); Kazuhiko Yamauchi, Osaka (JP); Soichiro Fujioka, Osaka (JP); Masaya Yamamoto, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 1151 days.

(21) Appl. No.: 11/885,882

(22) PCT Filed: Mar. 7, 2006

(86) PCT No.: PCT/JP2006/304303
§ 371 (c)(1),
(2), (4) Date: Sep. 7, 2007

(87) PCT Pub. No.: WO2009/095700
PCT Pub. Date: Sep. 14, 2006

(65) Prior Publication Data
US 2008/0138045 A1  Jun. 12, 2008

(30) Foreign Application Priority Data
Mar. 10, 2005 (JP) ................................. 2005-067986

(51) Int. Cl.
*H04N 9/80* (2006.01)
(52) U.S. Cl. ......... 386/240; 386/239; 386/248; 386/252
(58) Field of Classification Search ........... 386/239–260
See application file for complete search history.

(56) References Cited

U.S. PATENT DOCUMENTS

| | | | |
|---|---|---|---|
| 5,926,624 A * | 7/1999 | Katz et al. ..................... | 709/217 |
| 5,937,158 A | 8/1999 | Uranaka | |
| 5,944,790 A | 8/1999 | Levy | |
| 5,968,175 A | 10/1999 | Morishita et al. | |
| 6,092,112 A | 7/2000 | Fukushige | |
| 6,141,483 A | 10/2000 | Yamada et al. | |

(Continued)

FOREIGN PATENT DOCUMENTS
EP  1 338 989  8/2003
(Continued)

OTHER PUBLICATIONS

International Search Report of International Application No. PCT/JP2006/304303 dated Jun. 13, 2006.

(Continued)

*Primary Examiner* — Thai Tran
*Assistant Examiner* — Hung Dang
(74) *Attorney, Agent, or Firm* — Wenderoth, Lind & Ponack, L.L.P.

(57) ABSTRACT

To provide a playback device that plays back a content recorded in an optical disc in conjunction with execution of an application supplied by a server. The playback device includes a disc region code detection unit operable to detect a region code from the optical disc; an application region code estimation unit operable to estimate a region code assigned to the application based on an address of the server; a restriction unit operable, if a region code assigned to the playback device, the region code detected from the optical disc, and the estimated region code assigned to the application do not match each other, to restrict the playback of the content in conjunction with the execution of the application.

15 Claims, 14 Drawing Sheets

U.S. PATENT DOCUMENTS

| | | | |
|---|---|---|---|
| 6,151,631 A | 11/2000 | Ansell et al. | |
| 6,161,183 A | 12/2000 | Saito et al. | |
| 6,519,589 B2 * | 2/2003 | Mann et al. | 1/1 |
| 7,007,173 B2 | 2/2006 | Suzuki et al. | |
| 7,392,376 B2 * | 6/2008 | McKenney et al. | 713/152 |
| 2003/0187801 A1 | 10/2003 | Chase, Jr. et al. | |
| 2003/0215217 A1 | 11/2003 | Horii et al. | |
| 2004/0128145 A1 | 7/2004 | Sato | |
| 2004/0153918 A1 * | 8/2004 | Tanaka et al. | 714/724 |
| 2004/0175154 A1 * | 9/2004 | Yoon et al. | 386/96 |
| 2005/0165689 A1 | 7/2005 | Krasinski et al. | |
| 2005/0198115 A1 | 9/2005 | Sugimoto et al. | |
| 2005/0216414 A1 | 9/2005 | Higuchi | |
| 2006/0059106 A1 | 3/2006 | Chase, Jr. et al. | |
| 2006/0095383 A1 | 5/2006 | Chase, Jr. et al. | |
| 2007/0086727 A1 | 4/2007 | Tanaka et al. | |
| 2007/0160343 A1 | 7/2007 | Sugimoto et al. | |

FOREIGN PATENT DOCUMENTS

| | | |
|---|---|---|
| EP | 1 418 485 | 5/2004 |
| EP | 0 851 418 | 11/2004 |
| EP | 1 553 769 | 7/2005 |
| JP | 10-3459 | 1/1998 |
| JP | 10-69511 | 3/1998 |
| JP | 10-123950 | 5/1998 |
| JP | 2001-291021 | 10/2001 |
| JP | 2002-100165 | 4/2002 |
| JP | 2002-203068 | 7/2002 |
| JP | 2002-527806 | 8/2002 |
| JP | 2004-242340 | 8/2004 |
| WO | 98/10381 | 3/1998 |
| WO | 00/54128 | 9/2000 |
| WO | 01/31838 | 5/2001 |
| WO | 02/19598 | 3/2002 |
| WO | 03/088243 | 10/2003 |
| WO | WO 03/088664 * | 10/2003 |
| WO | 2004/030356 | 4/2004 |
| WO | 2005/071678 | 8/2005 |
| WO | 2006/009305 | 1/2006 |
| WO | 2006/085647 | 8/2006 |

OTHER PUBLICATIONS

International Preliminary Report on Patentability of International Application No. PCT/JP2006/304303 dated Apr. 10, 2007.

* cited by examiner

REPRODUCTION DEVICE, REPRODUCTION METHOD, AND REPRODUCTION PROGRAM

TECHNICAL FIELD

The present invention relates to a playback device that plays back contents, and specifically to an art for playing back contents recorded in an optical disc in conjunction with application programs.

BACKGROUND ART

BD-ROM playback devices can play back, in conjunction with a content recorded in a BD-ROM, an application program (hereinafter, referred to as just an "application") downloaded from a server device on a network. This conjunction can give users a new enjoyment to playback contents recorded in BD-ROMs. Since such an enjoyment cannot be realized in conventional DVD-Videos, manufacturers of BD-ROM playback devices hope to popularize playback of contents recorded in BD-ROMs in conjunction with applications supplied on network to make BD-ROM playback devices widespread among many users.

As a related art, Japanese Patent Application Publication No. H10-3459 and Japanese Patent Application Publication No. H10-69511 disclose an art for playing back data recorded in an optical disc in conjunction with data received from a server device on a network.

SUMMARY OF THE INVENTION

Problems the Invention is Going to Solve

In addition to manufacturers authorized by copyright owners and content providers (hereinafter, referred to as just "providers"), general users with programming techniques can manufacture and supply applications. In view of this, there is a possibility that an application manufactured by a general user (hereinafter, referred to as a "free application") is supplied by a server device located in a third country. Here, the third country is a country where the copyright protection is not secured under the law, i.e., a nonmember country of The Agreement on Trade-Related Aspects of Intellectual Property Rights (TRIPS) and the Berne Convention for the Protection of Literary and Artistic Works. Since the copyright protection is not secured under the law in the third country, a free application that greatly damages interests of copyrights might be supplied by a server located in the third country. For example, free applications might be supplied, such as a free application that defames a movie's casts, director, and distribution company, a malicious parody of a movie, and a free application that encourages viewing a movie in countries and regions other than distribution regions of the movie.

If damages caused by free applications supplied by servers located in third countries escalate, the movie industry might tighten regulation on free applications. However, such a regulation results in prohibiting good users from manufacturing and using free applications. This antagonizes users who enjoy free applications. As a result, there is a possibility that BD-ROM devices cannot be supported by the users, and therefore disappear from the market.

The present invention aims to provide a playback device, a playback method, and a playback program that are capable of maintaining a balance between users' hope to manufacture and use free applications and interests of copyright owners.

Means to Solve the Problems

In order to achieve the above aim, a playback device according to the present invention is a playback device that performs playback of a content recorded in an optical disc in conjunction with execution of an application program supplied by a server, the playback device comprising: a detection unit operable to detect a region code from the optical disc; an estimation unit operable to estimate a region code based on a source of the application program; and a restriction unit operable, if a region code assigned to the playback device, the detected region code, and the estimated region code do not match each other, to restrict the playback of the content in conjunction with the execution of the application program.

Here, a source of an application is any one of the following supplier sources of the application: a manufacturer of the application; a modifier of the application; and a server that supplies the application. Alternatively, the source includes all of the above supplier sources.

In order to achieve the above aim, a playback method according to the present invention is a playback method for performing, in a playback device having a region code assigned thereto, playback of a content recorded in an optical disc in conjunction with execution of an application program supplied by a server, the playback method comprising: a detection step for detecting a region code from the optical disc; an estimation step for estimating a region code based on a source of the application program; and a restriction step for, if a region code assigned to the playback device, the detected region code, and the estimated region code do not match each other, restricting the playback of the content in conjunction with the execution of the application program.

In order to achieve the above aim, a playback program according to the present invention is a playback program for performing, in a playback device having a region code assigned thereto, playback of a content recorded in an optical disc in conjunction with execution of an application program supplied by a server, the playback program comprising: a detection step for detecting a region code from the optical disc; an estimation step for estimating a region code based on a source of the application program; and a restriction step for, if a region code assigned to the playback device, the detected region code, and the estimated region code do not match each other, restricting the playback of the content in conjunction with the execution of the application program.

Effect of the Invention

With the above structure, playback of a content in conjunction with execution of an application is restricted in the playback device according to the present invention if a region code estimated using a source of the application does not match region codes respectively assigned to the playback device and an optical disc. Therefore, playback of a content in conjunction with execution of an application supplied by an undesired source can be restricted.

Also, the estimation unit may use a region code assigned to the application program, as an estimation result.

An application authorized by a provider is considered to have a theme accepted by the provider and a region code assigned thereto. Accordingly, in the playback device according to the present invention, an application authorized by a provider is prohibited from being played back in the provider's undesired region.

Also, the playback device may comprise a judgment unit operable to judge whether the source is legitimate based on digital signature information supplied by the server, wherein if the judgment unit judges affirmatively, the estimation unit may use the region code assigned to the application program, as the estimation result.

If an application has assigned thereto the provider's approved theme and a region code, the provider or an authority authorized by the provider attaches a digital signature to the application, and therefore a source of the application should be verified as legitimate. However, if an application having a digital signature attached thereto has been tampered with, a source of the application is not verified as legitimate in legitimacy judgment using a digital signature. Accordingly, in the playback device according to the present invention, even if a region code assigned to an application has been maliciously tampered with so as to match region codes respectively assigned to the playback device and an optical disc, playback of a content in conjunction with the application cannot be performed.

Also, the source may be a location of the server.

With the above structure, in the playback device according to the present invention, if an optical disc and a playback device that are sold in Japan and an application transmitted by a server located in a third country are used, playback of a content in conjunction with execution of the application is restricted.

Likewise, even if the optical disc and the playback device that are sold in Japan are used in the third country, playback of the content in conjunction with execution of the application is restricted.

Also, the playback device may further comprise a permission information storage unit that stores permission information showing locations permitted as locations of suppliers of the application program, wherein if the location of the server is included in the permitted locations, the estimation unit may use a region code that matches either one of the region code detected from the optical disc and the region code assigned to the playback device, as an estimation result.

With the above structure, even if a region code assigned to a country where a server is actually located is different from a region code assigned to the playback device, playback of a content in conjunction with execution of an application can be performed as long as the location of the server is registered beforehand in permission information.

Also, the optical disc may have recorded therein permission information showing locations permitted as locations of suppliers of the application program, the playback device may further comprise an information detection unit operable to detect the permission information from the optical disc, and if the location of the server is included in the permitted locations, the estimation unit may use a region code that matches either one of the detected region code and the region code assigned to the playback device, as an estimation result.

With the above structure, even if a region code assigned to a country where a server is actually located is different from a region code assigned to the optical disc, playback of a content in conjunction with execution of an application can be performed as long as the location of the server is registered beforehand in permission information. The provider can distribute a content together with the permission information, and therefore can conveniently permit provision of an application and control playback of the content in conjunction with execution of the application.

Also, the permission information may show the permitted locations using region names.

With the above structure, in the playback device according to the present invention, countries or regions where the copyright is protected under the law are registered beforehand in permission information. Accordingly, good free applications can be received from various servers located in such countries or regions, while malicious applications are regulated by the judiciary.

Therefore, a server located in a country where the copyright is protected under the law can supply applications to countries having region codes different from a region code of the country. Also, interests of a provider who is a copyright owner can be protected, without prohibiting good users from manufacturing and using free applications.

Also, the permission information may show the permitted locations using addresses on a network.

For example, an address of a specific server that is expected not to supply malicious applications such as a server authorized by the provider is registered before hand in the permission information. Due to this, in the playback device according to the present invention, applications can be received from this beforehand registered server, regardless of a region code assigned to a region where the server is located.

Accordingly, a server authorized by the provider can supply applications to a plurality of countries each having different region codes. Therefore, interests of the provider who is a copyright owner, without prohibiting good users from manufacturing and using free applications.

Also, the estimation unit may use a region code corresponding to a country shown by a country code Top Level Domain included in a domain name of the server, as an estimation result.

With the above structure, the playback device according to the present invention can easily identify a location of a server.

Also, each time a connection destination for receiving the application program is changed to an address of another country code Top Level Domain, the estimation unit may perform the estimation.

With the above structure, if a connection destination jumps to another connection destination during acquisition of an application, the playback device according to the present invention can control whether to perform playback of a content in conjunction with execution of the application, using an address of the another connection destination. Therefore, the following possibility can be prevented that a connection destination is changed to the user's unintended server to receive a malicious application supplied by an unknown server and execution of the malicious application causes damage such as so-called phising to the user.

Also, the application program may have assigned thereto a region code by the server, in accordance with a time when the application program is supplied, and the playback device may further comprise a re-acquisition unit operable, if the restriction unit restricts the playback of the content in conjunction with the execution of the application program, to re-acquire the application program from the server when playing back the content next time.

An application has assigned thereto a region code of a region where a content has been released. Therefore, playback of the content in conjunction with the application is restricted in a region where the content has not been released yet. However, if the content is played back after the content has been released, the application having newly assigned thereto a region code of the region is re-acquired, and therefore, playback of the content in conjunction with the application can be performed.

DESCRIPTION OF CHARACTERS

Figure 1:
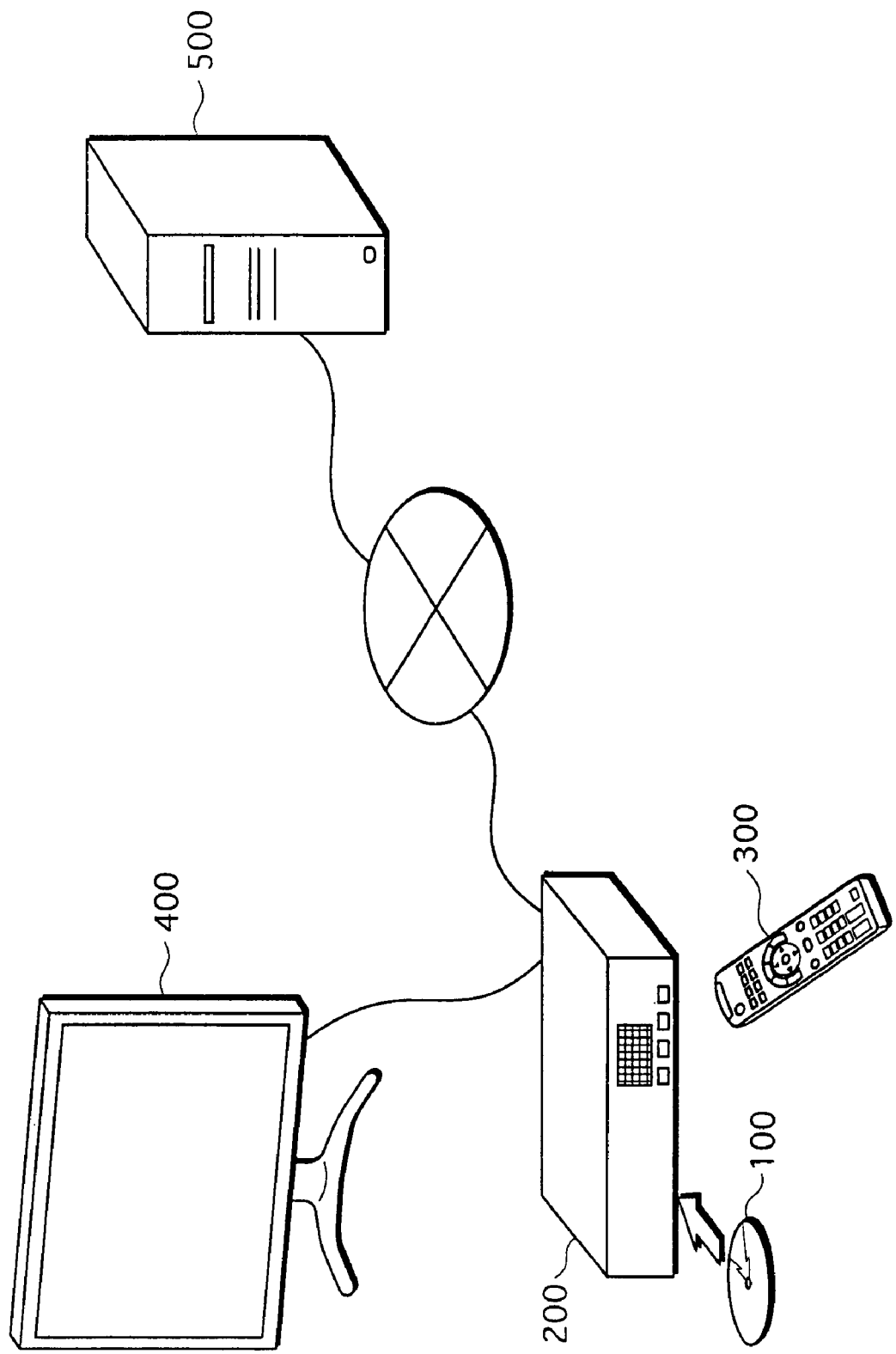
FIG. 1 shows an example of use of a playback device 200 according to the present invention.

1: BD drive
2: network device
3: local storage
4: device region code storage unit
5: conjunction content generation unit
6: playback unit
7: region information storage unit
8: microcomputer system
9: application region code estimation unit
10: conjunction condition acquisition unit
11: disc region code detection unit
12: restriction unit
13: condition information storage unit
14: application acquisition control unit
15: presentation unit
100, 101, and 102: BD-ROM
200: playback device
300: remote control
400: TV
500, 501, 502, 503, 504, and 505: supplier server
501a, 501b, and 504a: authorized application
501c, 502b, 503a, 504b, and 505a: unauthorized application

DETAILED DESCRIPTION OF THE INVENTION (First Embodiment)

The following describes an embodiment of a playback device 200 according to the present invention.

FIG. 1 shows an example of use of the playback device 200 according to the present invention. The playback device 200 constitutes a home theater system together with a supplier server 500, a remote control 300, and a TV 400. The supplier server 500 is a server device that supplies applications via a network. The applications supplied by the supplier server 500 include an application having attached thereto a region code and a digital signature (hereinafter, referred to as an "authorized application") and an application having attached thereto neither a region code nor a digital signature (hereinafter, referred to as an "unauthorized application"). The digital signature attached to the authorized application is an X.509 certificate. Digital signature authentication enables verification about whether a manufacturer of the authorized application is a manufacturer authorized by a provider and about whether the authorized application and the region code have been tampered with. The X.509 is disclosed in detail in RFC2459 and so on, and therefore its description is omitted here.

A BD-ROM 100 is a recording medium that supplies contents such as a movie to the home theater system. The playback device 200 is a BD-ROM player that has not only a normal playback function for playing back contents recorded in the BD-ROM 100 but also a conjunction playback function for playing back the contents recorded in the BD-ROM 100 in conjunction with applications, in accordance with user operations to the remote control 300.

Figure 2:
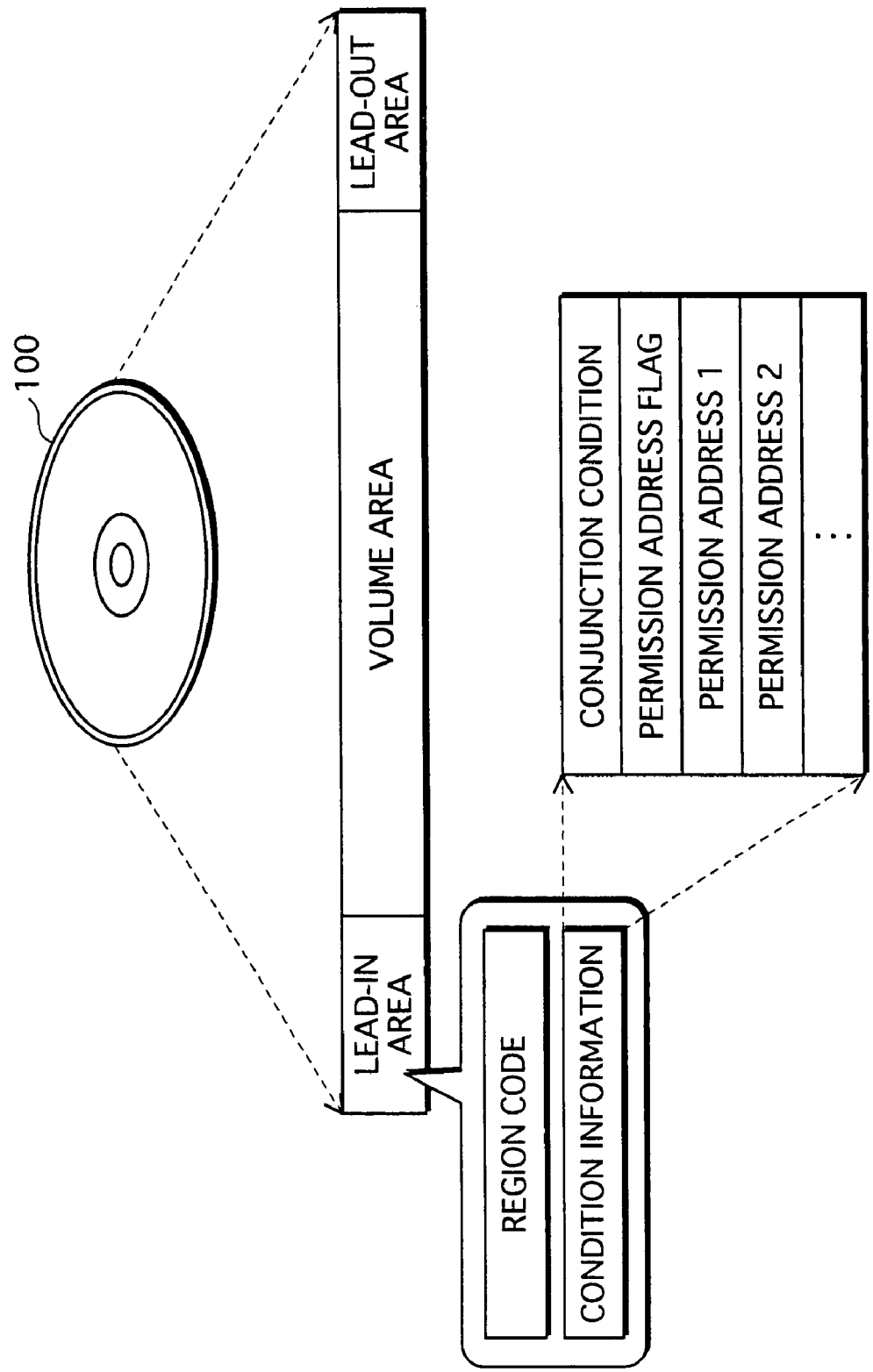
FIG. 2 shows a structure of a BD-ROM 100.

The following describes the BD-ROM 100 in the home theater system. FIG. 2 shows a structure of the BD-ROM 100 according to the first embodiment. The BD-ROM 100 shown in FIG. 2 is a read-only optical disc having a content recorded therein. A region code and condition information are recorded in a lead-in area, which is the innermost track of the BD-ROM 100. The content is recorded in a volume area. The region code shows a region where the BD-ROM 100 is permitted to be played back. Hereinafter, a region code recorded in a: lead-in area of a BD-ROM is referred to as a "disc region code". The condition information includes a "conjunction condition", a "permission address flag", and a "permission address". Setup of the condition information by the provider enables management of playback of a content in conjunction with an unauthorized application.

The "conjunction condition" is a condition for playback of a content in conjunction with an unauthorized application. If the conjunction condition has a value of "0", the conjunction is unconditionally permitted. If the conjunction condition has a value of "1", a region code of the unauthorized application is estimated and the conjunction is conditionally permitted. If the conjunction condition has a value of "2", the conjunction is unconditionally prohibited.

The "permission address flag" shows whether there is a server authorized by the provider. The "permission address" is effective only if the permission address flag shows that there is an authorized server, and shows addresses of one or more authorized servers. The provider can control playback of contents in conjunction with unauthorized applications by distributing BD-ROMs in which condition information is stored together with the contents.

Note that even if any one of an IP address and a domain name is used as a server address, query to a DNS (Domain Name System) server enables conversion of the server address between the domain name and the IP address. Hereinafter, both IP addresses and domain names are referred to as just "addresses". Conversion between the domain names and the IP addresses is performed on demand by querying to the DNS server, and therefore its description is omitted here.

Figure 3:
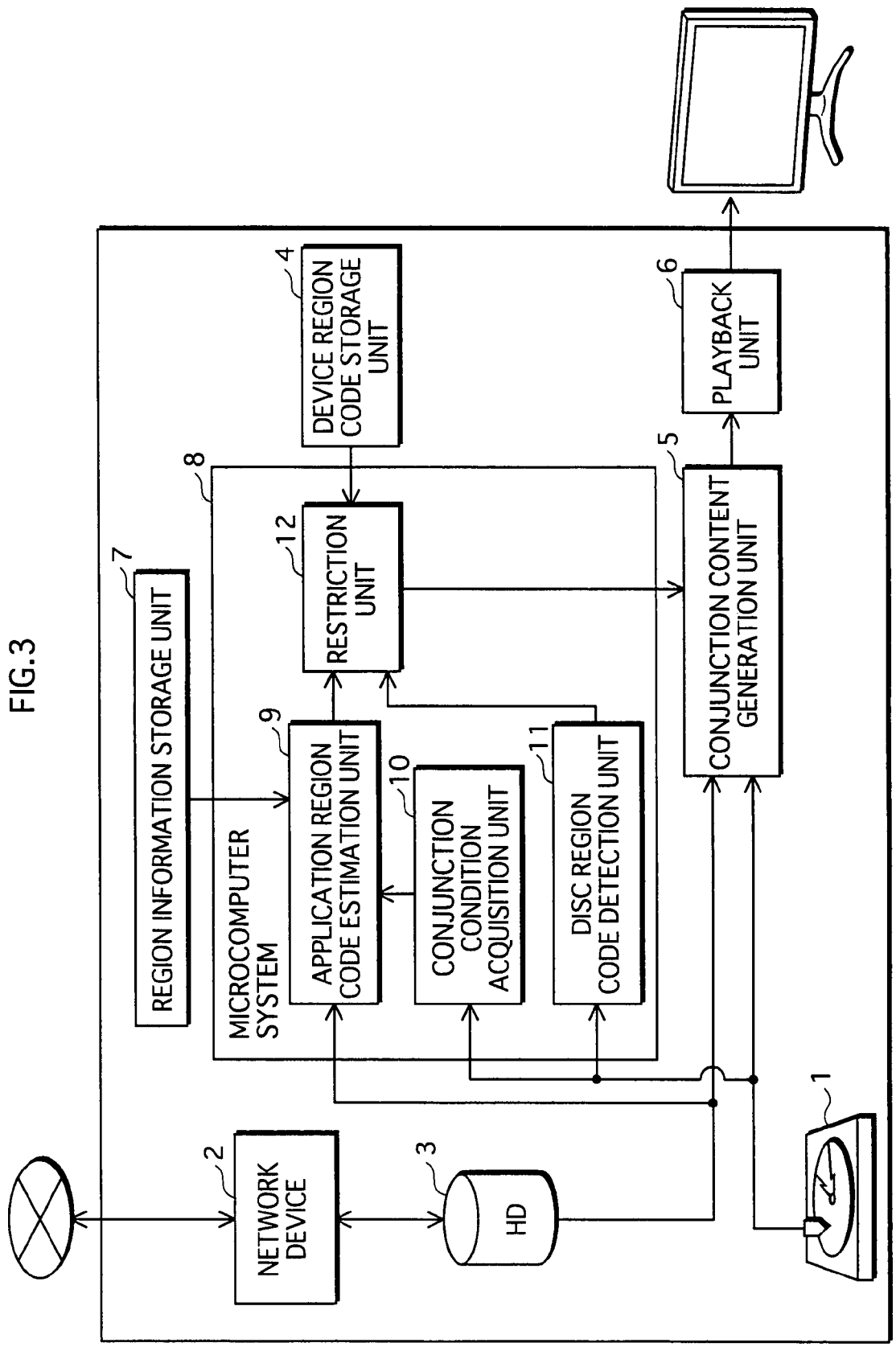
FIG. 3 shows an internal structure of a playback device 200 according to a first embodiment.

The following describes an internal structure of the playback device 200. FIG. 3 shows the internal structure of the playback device 200. As shown in FIG. 3, the playback device 200 includes a BD drive 1, a network device 2, a local storage 3, a device region code storage unit 4, a conjunction content generation unit 5, a playback unit 6, a region information storage unit 7, and a microcomputer system 8.

The BD drive 1 performs loading/ejecting of the BD-ROM 100, and accesses the BD-ROM 100.

The network device 2 accesses the supplier server 500 via the network to receive applications from the supplier server 500. Here, an address of the supplier server 500 is acquired by a user input, a description in the content, and so on. Alternatively, the network device 2 may store therein beforehand an address of a server that supplies a portal site.

Figure 4A:
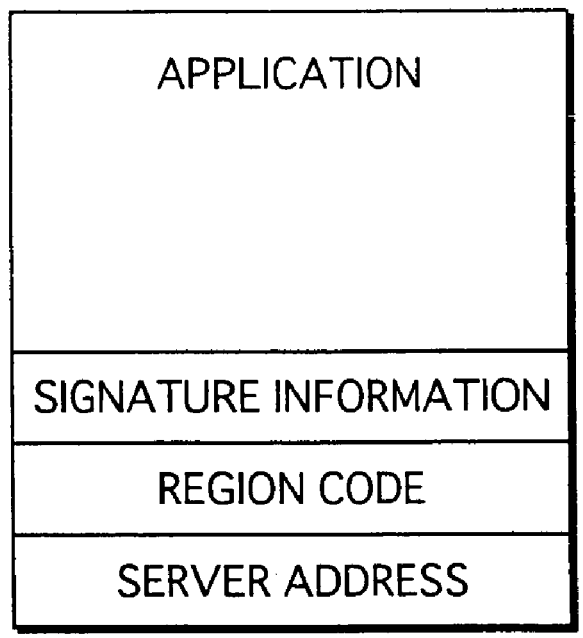
FIG. 4A shows a structure of an authorized application stored in a local storage.
Figure 4B:
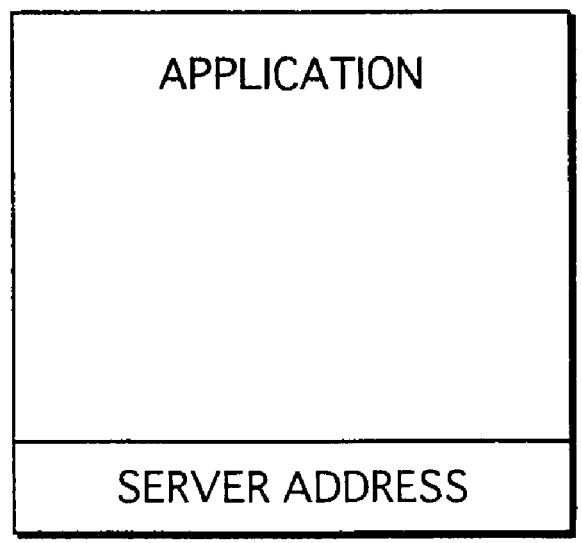
FIG. 4B shows a structure of an unauthorized application stored in the local storage.

The local storage 3 stores therein applications acquired by the network device 2. Each of the stored applications has attached thereto an address of the server from which the application is acquired by the network device 2. Specifically, if the acquired application is an authorized application, the network device 2 stores the authorized application in the local storage 3 such that a digital signature, a region code, and a server address are assigned as shown in FIG. 4A. On the other hand, if the acquired application is an unauthorized application, the network device 2 stores the unauthorized application in the local storage 3 such that an address of a server from which the unauthorized application is acquired is assigned as shown in FIG. 4B.

The device region code storage unit 4 stores therein a region code assigned to a region where the playback device 200 is sold such that the region code cannot be rewritten. Hereinafter, a region code stored in the device region code storage unit 4 is referred to as a "device region code".

The conjunction content generation unit 5 merges data of a content read from the BD-ROM 100 by the BD drive 1 with data of an application read from the local storage 3 to generate a conjunction content.

The playback unit 6 includes a video decoder for decoding moving images, an audio decoder for decoding sounds, a graphics decoder for decoding subtitles, and so on. The playback unit 6 plays back contents recorded in the BD-ROM 100 and conjunction contents generated by the conjunction content generation unit 5.

The region information storage unit 7 stores therein region information showing countries and regions permitted as regions of supplier sources of unauthorized applications used for conjunction playback by the playback device 200. The region information is shown using country codes (cc) defined in ISO (International Organization for Standardization) 3166. In the region information, countries and regions where the copyright protection is secured under the law are registered by the manufacturer at manufacturing of the playback device 200.

The microcomputer system 8 is a computer system composed of a CPU, a ROM, and a RAM. Through the CPU's reading of programs stored in the ROM and collaboration of the programs and hardware resources, the microcomputer system 8 achieves the functions of the application region code estimation unit 9, the conjunction condition acquisition unit 10, the disc region code detection unit 11, and the restriction unit 12.

The application region code estimation unit 9 verifies whether an acquired authorized application is legitimate using a digital signature attached to the authorized application. If the authorized application is verified as legitimate, the application region code estimation unit 9 acquires a region code attached to the authorized application and outputs the acquired region code. If the authorized application is not verified as legitimate, or if an unauthorized application is acquired, the application region code estimation unit 9 estimates a region code of the application using an address of a server from which the application was supplied and outputs the estimated region code. Hereinafter, a region code output by the application region code estimation unit 9 is referred to as an "application region code".

The conjunction condition acquisition unit 10 acquires condition information from the data read from the BD-ROM 100 by the BD drive 1.

The disc region code detection unit 11 acquires a disc region code from the data read from the BD-ROM 100 by the BD drive 1.

The restriction unit 12 controls generation of conjunction contents by the conjunction content generation unit 5, in accordance with a combination of the device region code, the disc region code, and an application region code.

This completes the description of the structure of the playback device 200.

The following describes playback control performed by the microcomputer system 8 using an application region code.

Figure 5:
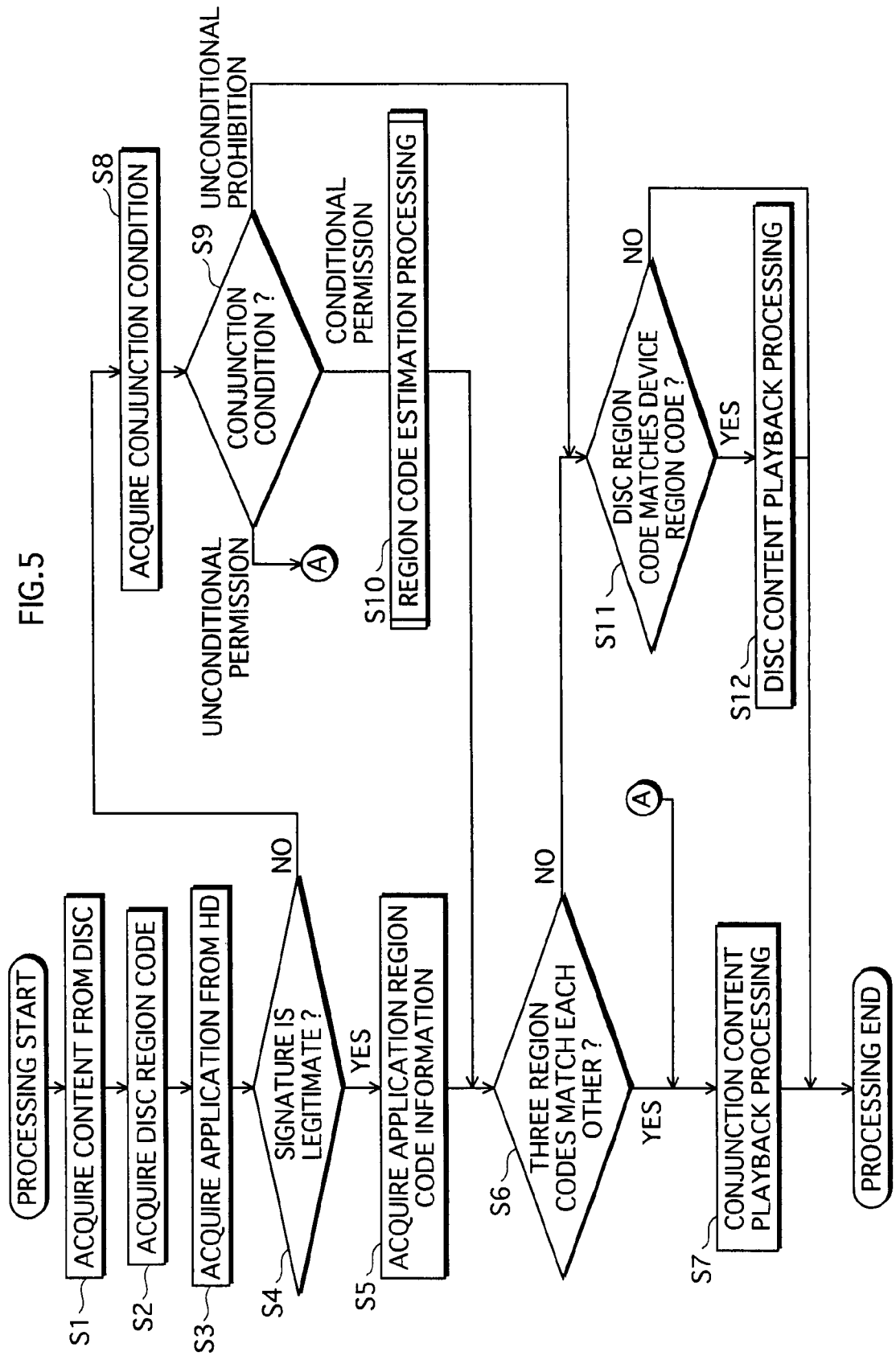
FIG. 5 is a flow chart showing a procedure of playback control processing.

FIG. 5 is a flow chart showing a procedure of playback control processing.

In the playback control processing, a content and an application are read in Steps S1 to S3, in accordance with user operations instructing playback of the content. In Step S1, the BD drive 1 reads data. In Step S2, the disc region code detection unit 11 acquires the disc region code from the read data. In Step S3, the application stored in the local storage 3 is read.

After the reading of the application, the application region code estimation unit 9 performs legitimacy judgment of the application using a digital signature (Step S4). The legitimacy judgment of the application is verification using the digital signature about whether a manufacturer of the application is a manufacturer authorized by the provider and about whether the application and a region code attached thereto have been tampered. If the manufacturer is authorized by the provider and the application and the region code have not been tampered, the application region code estimation unit 9 judges that the application is legitimate.

If the authorized application is legitimate (Step S4: Yes), the application region code estimation unit 9 acquires the region code attached to the authorized application (Step S5). If the authorized application has been tampered, or if the read application is an unauthorized application (Step S4: No), the application region code estimation unit 9 estimates a region code of the application in Steps S8 to S10.

In Step S8, the conjunction condition acquisition unit 10 acquires condition information from the data read in Step S1. If a conjunction condition set in the acquired condition information has a value of "0" showing that conjunction is unconditionally permitted (Step S9: unconditional permission), the restriction unit 12 permits the conjunction content generation unit 5 to merge the application and the content. As a result, playback of the content in conjunction with the application is performed in Step S7 through the processing performed by the conjunction content generation unit 5 and the playback unit 6.

If the conjunction condition set in the condition information acquired in Step S8 has a value of "2" showing that the conjunction is unconditionally prohibited (Step S9: unconditional prohibition), the restriction unit 12 prohibits the conjunction content generation unit 5 from merging the application and the content. As a result, normal playback of the content is performed through the processing performed by the conjunction content generation unit 5 and the playback unit 6 in Steps S11 and S12.

If the conjunction condition set in the condition information acquired in Step S8 has a value of "1" showing that the conjunction is conditionally permitted (Step S9: conditional permission), the conjunction condition acquisition unit 10 notifies the application region code estimation unit 9 of a permission address flag and a permission address set in the condition information. Upon receiving the notification, the application region code estimation unit 9 performs region code estimation processing in Step S10 to estimate an application region code based on an address of a server from which the application was supplied.

If the application region code attached to the authorized application is acquired in Step S5, or if the application region code is estimated in Step S10, the restriction unit 12 compares the disc region code, the device region code, and the application region code with each other. If these three region codes match each other (Step S6: Yes), the restriction unit 12 permits the conjunction content generation unit 5 to merge the application and the content to generate a conjunction content. As a result, playback of the content in conjunction with the applications performed through the processing by the conjunction content generation unit 5 and the playback unit 6 (Step S7). If these three region codes do not match each other (Step S6: No), the restriction unit 12 prohibits the conjunction content generation unit 5 from merging the application and the content, and causes the conjunction content generation unit 5 to output the content read by the BD drive 1 without being merged with the application. As a result, normal playback of the content is performed in Steps S11 and S12 through the processing by the conjunction content generation unit 5 and the playback unit 6. This completes the description of the procedure of the playback control processing.

Through the above procedure of the playback control processing, only if an application region code assigned to an application verified as legitimate by digital signature authentication or an application region code estimated based on an address of the server matches the disc region code and the device region code, playback of the content in conjunction with execution of the application is permitted.

The following describes in detail region code estimation processing performed by the application region code estimation unit 9.

Figure 6:
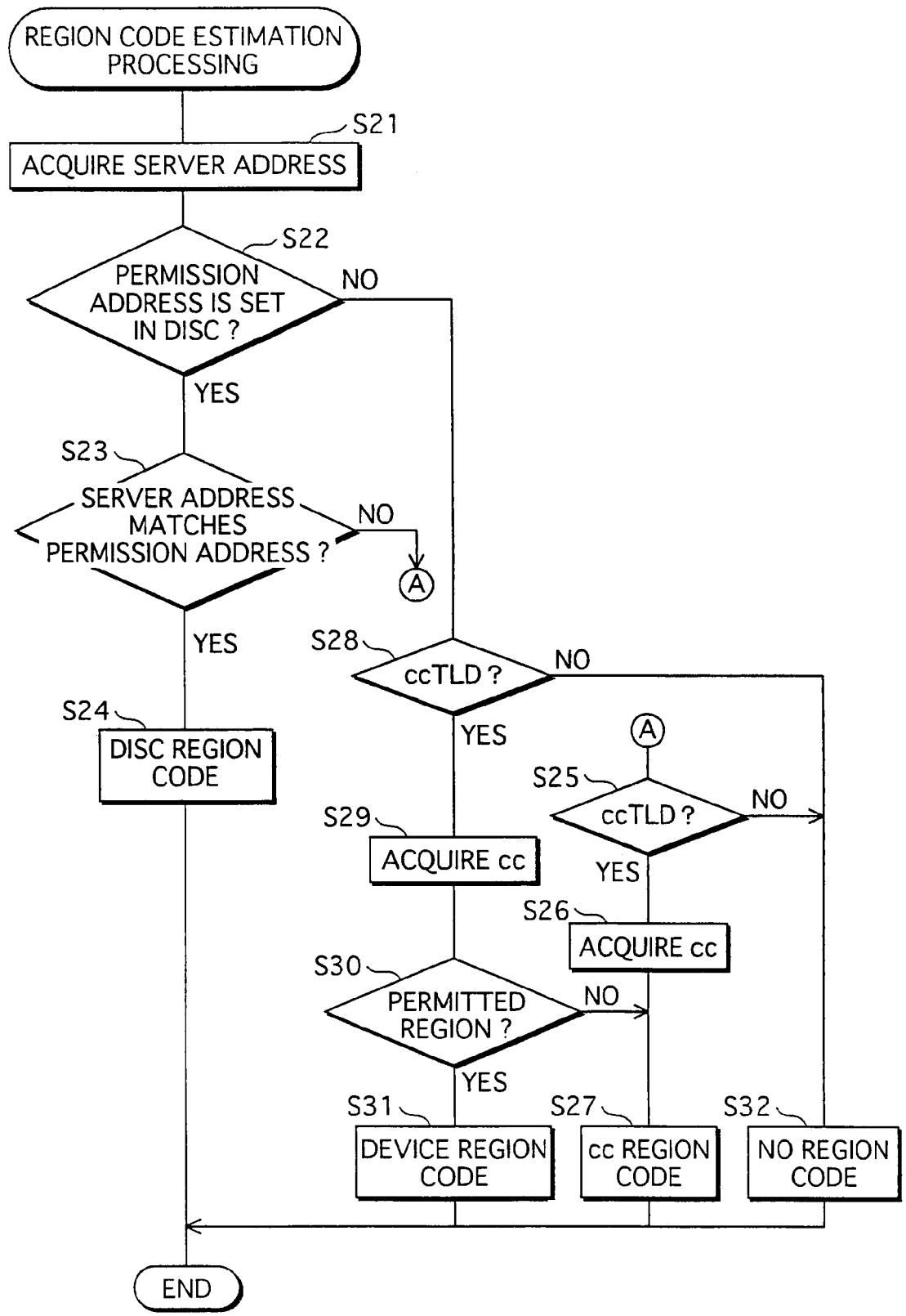
FIG. 6 is a flow chart showing a procedure of region code estimation processing.

FIG. 6 is a flow chart showing a procedure of the region code estimation processing. In the region code estimation processing, the application region code estimation unit 9 firstly acquires a server address attached to an application (Step S21). Then, the application region code estimation unit 9 judges whether a permission address is set in the BD-ROM 100 based on the permission address flag included in the condition information read by the BD drive 1 (Step S22).

If the permission address is set in the BD-ROM 100 (Step S22: Yes), the application region code estimation unit 9 estimates an application region code in accordance with a condition determined by the provider in Steps S23 to S27, and S32. If the permission address is not set in the BD-ROM 100 (Step S22: No), the application region code estimation unit 9 estimates an application region code in accordance with a condition stored in the playback device 200 in Steps S28 to S32 and S27.

In the region code estimation in accordance with the condition determined by the provider, in Step S23, the application region code estimation unit 9 judges whether the application is supplied by an authorized server, by comparing the server address attached to the application with the permission address set in the BD-ROM 100. If the server address attached to the application is set as the permission address (Step S23: Yes), the application region code estimation unit 9 estimates that an application region code is the same as the disc region code (Step S24).

On the other hand, if the server address attached to the application is not set as the permission address (Step S23: No), the application region code estimation unit 9 acquires a country code of the server in Steps S25 and S26.

In Step S25, the application region code estimation unit 9 judges whether a Top Level Domain (hereinafter, referred to as a "TLD") included in a domain of the server is a ccTLD (country code TLD). If the TLD is the ccTLD (Step S25: Yes), the application region code estimation unit 9 acquires the country code from the domain of the server (Step S26), and estimates that an application region code is a region code assigned to a country or a region shown by the country code of the domain of the server (Step S27). If the TLD of the domain of the server is a gTLD (generic TLD) (Step S25: No), the application region code estimation unit 9 cannot estimate a country or region where the supplier server is located, and therefore estimates that the application has no region code assigned thereto (Step S32).

In the region code estimation in accordance with the condition stored in the playback device 200, the application region code estimation unit 9 firstly acquires the country code of the server in Steps S28 and S29. The processing in Steps S28 and S29 are the same as the processing in Steps S25 and S26. If the TLD of the domain of the server is the ccTLD (Step S28: Yes), the application region code estimation unit 9 acquires the country code from the domain of the server (Step S29), and judges whether the acquired country code is stored in the region information storage unit 7, as a country code showing a country or region permitted as a country or region of a supplier source of an unauthorized application used for conjunction playback (Step S30). If the acquired country code is stored in the region information storage unit 7 (Step S30: Yes), the application region code estimation unit 9 estimates that an application region code is the same as the device region code (Step S31). If the acquired country code is not stored in the region information storage unit 7 (Step S30: No), the application region code estimation unit 9 estimates that the application region code is the same as the region code assigned to a country or region shown by the country code of the domain of the server (Step S27). Also, if the TLD of the domain of the server is the gTLD (Step S28: No), the application region code estimation unit 9 estimates that the application has no region code assigned thereto (Step S32).

Through the above procedure of the region code estimation processing, a region code of an application can be estimated based on an address of a server from which the application is supplied.

The following describes conditions for playback of contents in conjunction with applications in the playback device 200 in a case where the applications are supplied by supplier servers located in various countries.

Figure 7:
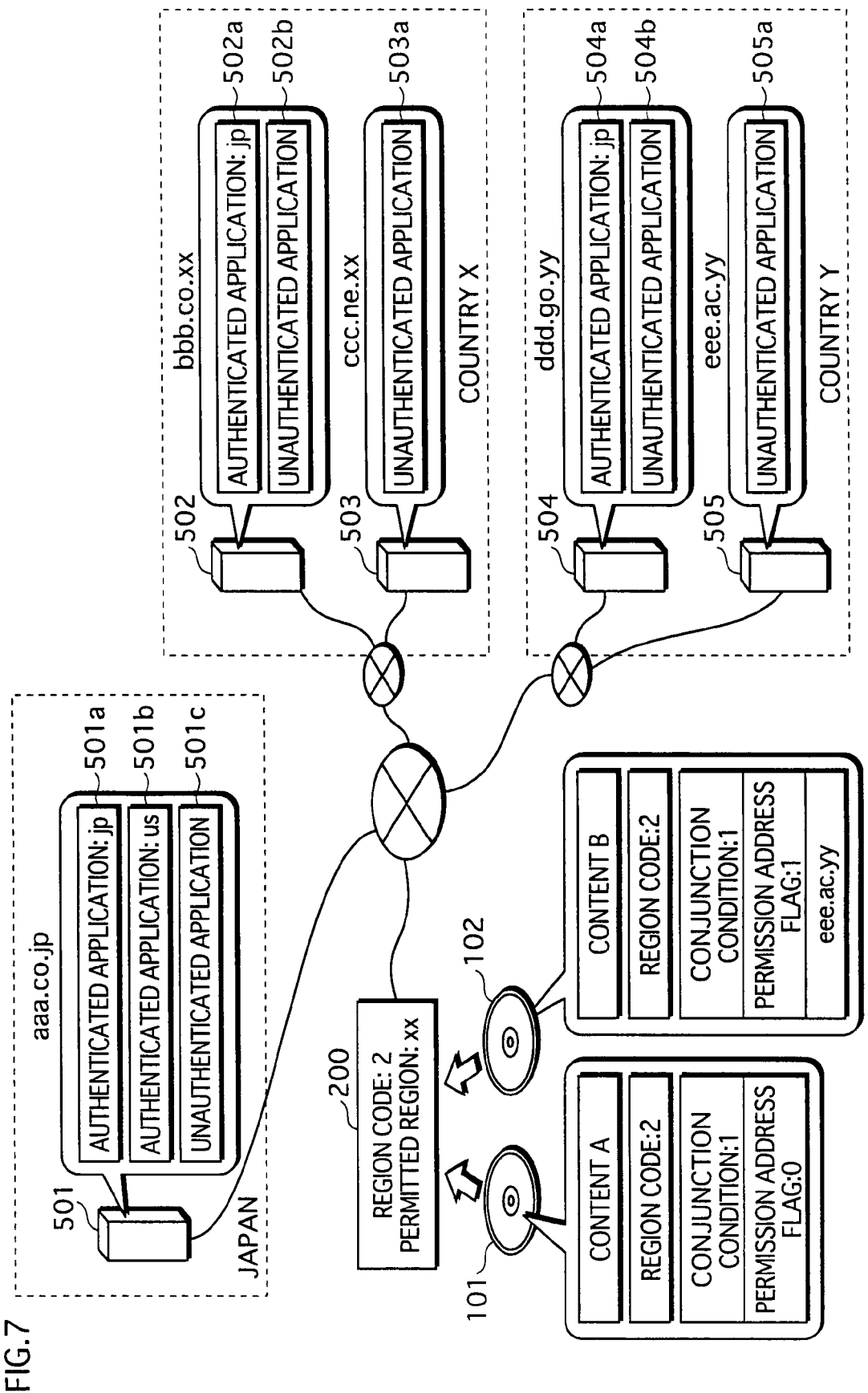
FIG. 7 shows an example combination of a disc region code, a device region code and an application region code.

FIG. 7 shows an example combination of a disc region code, a device region code, and an application region code thereof. The playback device 200 is sold in Japan, and has a code "2" as a device region code. The region code "2" is assigned to a region including Japan. The region information storage unit 7 has only a code "xx", which is a country code assigned to a country "X". This is because the copyright protection is secured under the law in the country "X", but a country "Y" is a non-member of the TRIPS and the Berne Convention, and therefore the copyright protection is not secured under the law in the country "Y". Note that the countries "X" and "Y" are included in a region to which a region code "5" is assigned thereto.

As well as the playback device 200, a BD-ROM 101 having a content "A" recorded therein and a BD-ROM 102 having a content "B" recorded therein are sold in Japan, and each have the code "2" as a disc region code thereof. Note that condition information recorded in the BD-ROM 101 has no permission address, and condition information recorded in the BD-ROM 102 has a permission address "eee.ac.yy".

Firstly, the following describes a condition for playback of a content in conjunction with an authorized application in the playback device 200 having the above-mentioned structure. Note that the authorized application has not been tampered here.

If receiving the authorized application, the playback device 200 judges whether conjunction playback is permitted based on a region code attached to the authorized application, irrespectively of a country where a supplier server of the authorized application is located. Here, the code "2" is attached as the region code of Japan (jp) to each of authorized applications 501a, 502a, and 504a, which is permitted to be used in Japan. A code "1" is attached as a region code of U.S.A. (us) to an authorized application 501b, which is permitted to be used in U.S.A. Accordingly, each of the authorized applications 501a, 502a, and 504a having the region code "2" attached thereto is permitted to be played back in conjunction with both the contents "A" and "B". However, although the authorized application 501b is supplied by the supplier server 501 located in Japan, the authorized application 501b has the region code "1" attached thereto, and therefore is not permitted to be played back in conjunction with both the contents "A" and the contents "B".

The following describes a condition for playback of a content in conjunction with an unauthorized application in the playback device 200. The unauthorized application has a different region code estimated in the playback device 200, depending on a combination of an address of a supplier server, a country code set in the region information storage unit 7, a permission address set in a BD-ROM, and so on.

The content "A" has no permission address in condition information recorded in the BD-ROM 101. Accordingly, an application region code of the unauthorized application is estimated by comparing a ccTLD of the supplier server with the country code "xx" assigned to the country "X" stored in the region information storage unit 7 of the playback device 200. Therefore, unauthorized applications 502b and 503a respectively supplied by supplier servers 502 and 503 located in the country "X" are estimated to have a code "2" as an application region code thereof that are the same as the device region code of the playback device 200. Therefore, the unauthorized applications 502b and 503a are permitted to be played back in conjunction with the content "A". However, the country code "yy" of the country "Y" where supplier servers 504 and 505 that respectively supply unauthorized applications 504b and 505a are located is not stored in the region information storage unit 7. Accordingly, the unauthorized applications 504b and 505a are estimated to have a code "5" assigned to the country "Y" as an application region code based on "yy" that is a ccTLD of the supplier servers 504 and 505. Therefore, the unauthorized applications 504b and 505a are prohibited from being played back in conjunction with the content "A". Note that a country code of Japan "jp" is not stored in the region information storage unit 7. An unauthorized application 501c supplied by the supplier server 501 located in Japan is estimated to have the code "2" assigned to Japan as an application region code based on the ccTLD of the supplier server 501. Therefore, the unauthorized application 501c is permitted to be played back in conjunction with the content "A".

On the other hand, the content "B" has a permission address set in the condition information recorded in the BD-ROM 102. Therefore, an application region code of an unauthorized application is estimated by comparing an address of a supplier server with a permission address set in the BD-ROM 102 "eee.ac.yy". Therefore, the unauthorized application 505a supplied by the supplier server 505 having a domain "eee.ac.yy" included in supplier servers located in the countries "X" and "Y" is estimated to have the code "2" that is the same as the disc region code, as an application region code. Therefore, the unauthorized application 505a is permitted to be played back in conjunction with the content "B". However, supplier servers other than the supplier server 505 located in the countries "X" and "Y", namely, the servers 502, 503, and 504 each do not have an address registered as a permission address. Accordingly, the unauthorized applications 502b, 503a, and 504b respectively supplied by the supplier servers 502, 503, and 504, are estimated to have an application region code "5" assigned to the countries "X" and "Y". Therefore, the unauthorized applications 502b, 503a, and 504b are not permitted to be played back in conjunction with the content "B". Note that although the address of the supplier server 501 located in Japan is not registered in the permission information, the unauthorized application 501c supplied by the supplier server 501 is estimated to have an application region code "2" assigned to Japan based on the ccTLD of the supplier server 501 "jp". Therefore, the unauthorized application 501c is permitted to be played back in conjunction with the content "B".

According to the first embodiment as described above, if a estimated application region code does not match either the device region code or the disc region code, playback of a content in conjunction with the application is restricted.

Applications supplied by a server located in a country where copyrights are not protected are prohibited from being played back in conjunction with contents. Therefore, interests of copyright owners can be protected. On the other hand, by supplying applications from servers located in Japan or countries registered in the playback device 200 where the copyright protection is secured under the law, users who hope to manufacture and use applications can enjoy conjunction playback using the playback device 200 and BD-ROMs sold in Japan.

Note that, in the first embodiment, locations of supplier sources of unauthorized applications are restricted by selectively using either of condition information set in the BD-ROM by the provider and the region information set in the playback device 200 by the manufacturer. Alternatively, the locations of the supplier sources of the unauthorized applications may be restricted by using another methods.

The following describes a modification in which if a server satisfies either of condition information set in a BD-ROM and the region information set in the playback device 200, the server is permitted as a supplier server of unauthorized applications.

Figure 8:
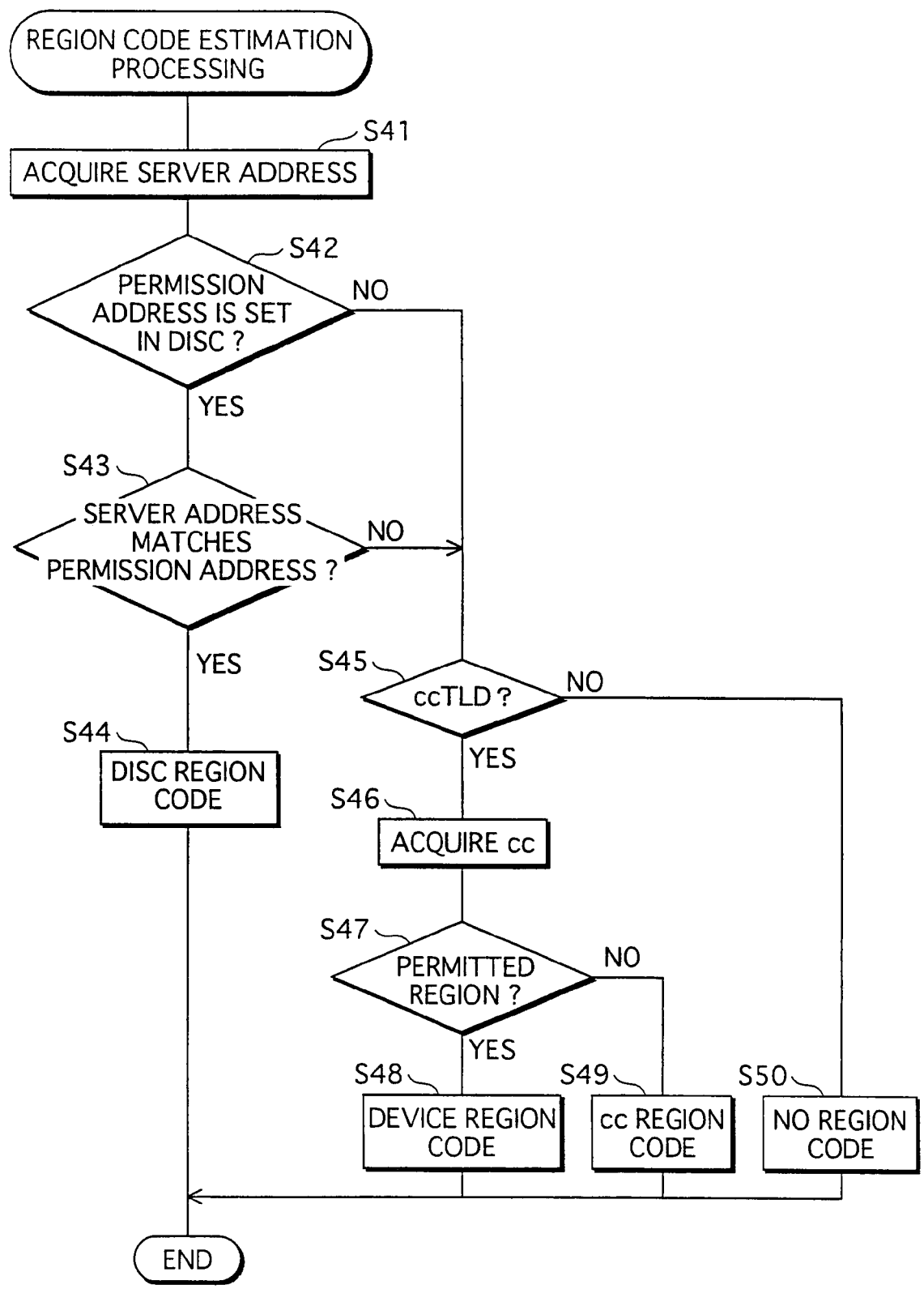
FIG. 8 is a flow chart showing a procedure of region code estimation processing according to a modification of the first embodiment.

Specifically, the region code estimation processing by the application region code estimation unit 9 is performed as shown in FIG. 8. This can authorize a server that satisfies either of condition information set in the BD-ROM and the region information set in the playback device 200, as a supplier source of an unauthorized application.

A flow chart shown in FIG. 8 differs from the flow chart shown in FIG. 6 in the processing in Step S43: No, in which a server address is not set as a permission address in the condition information recorded in the BD-ROM.

In the flow chart shown in FIG. 6, if the server address is not set as the permission address (Step S23: No), a region code of a region shown by a ccTLD of the server address is estimated as an application region code.

In the modification, if the server address is not set as the permission address (Step S43: No), and in Steps S45 to S48, further if the ccTLD of the server address is set in the region information (Step S47: Yes), a region code that is the same as the device region code is estimated as the application region code (Step S48).

Accordingly, in the modification, if an unauthorized application is received from each of the servers shown in FIG. 7, the content "A" having no set permission information is permitted to be played back in conjunction with the unauthorized application 501c supplied by the server located in Japan and the unauthorized applications 502b and 503a supplied by the servers located in the country "X" permitted based on the region information. The content "B" having the set permission information is permitted to be played back in conjunction with, in addition to the unauthorized applications 501c, 502b, and 503a, the unauthorized application 505a supplied by the supplier server 505 having the server address set as the permission address of the BD-ROM.

(Second Embodiment)

In the first embodiment, the conjunction conditions are recorded in the BD-ROMs. A second embodiment is an embodiment in which conjunction conditions are stored in the playback device 200.

Figure 9:
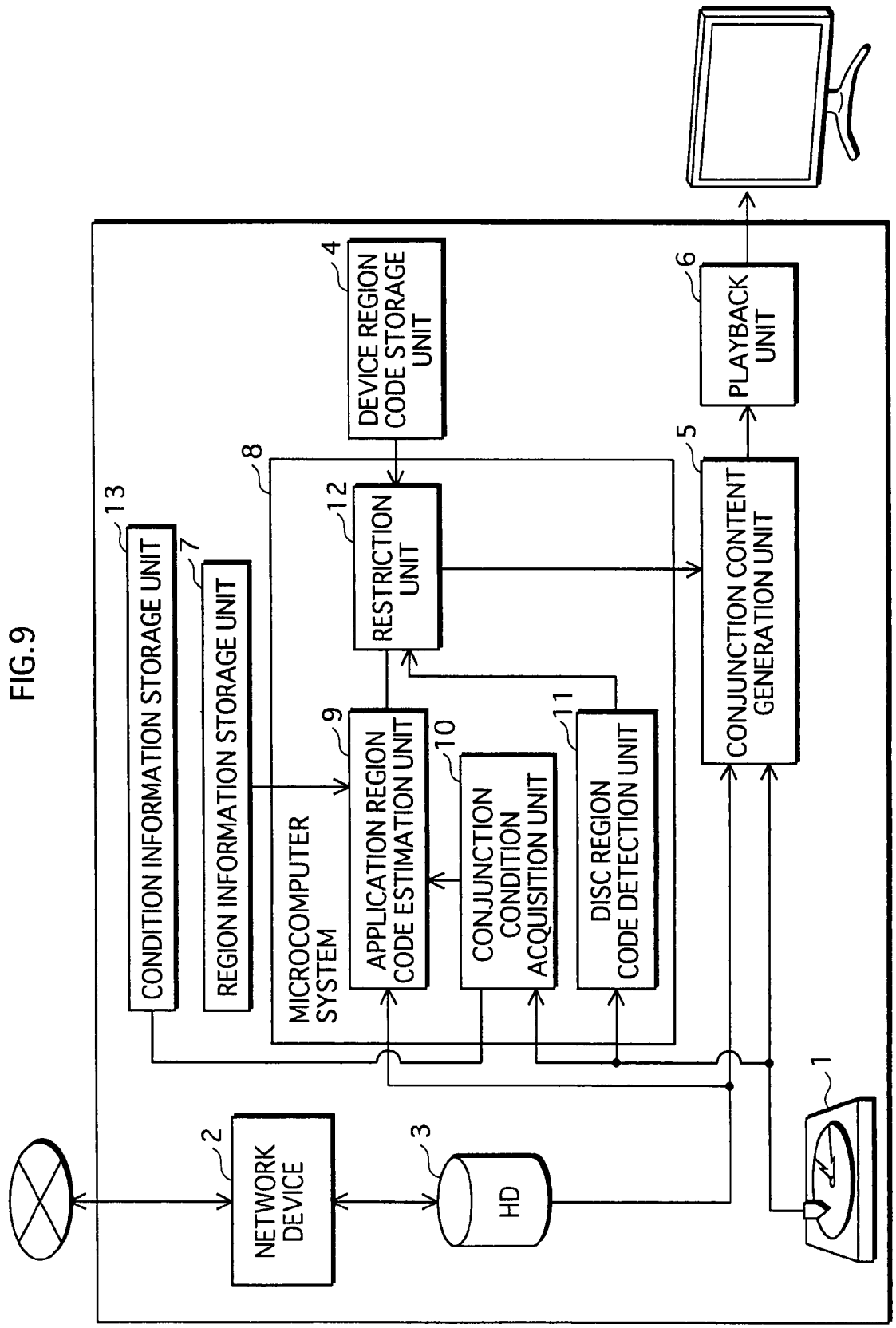
FIG. 9 shows an internal structure of a playback device 200 according to a second embodiment.

FIG. 9 shows an internal structure of a playback device 200 according to the second embodiment. The playback device 200 according to the second embodiment includes a condition information storage unit 13 in addition to the structure shown in FIG. 3.

The condition information storage unit 13 stores therein provider condition information for each provider of contents.

Figure 10:
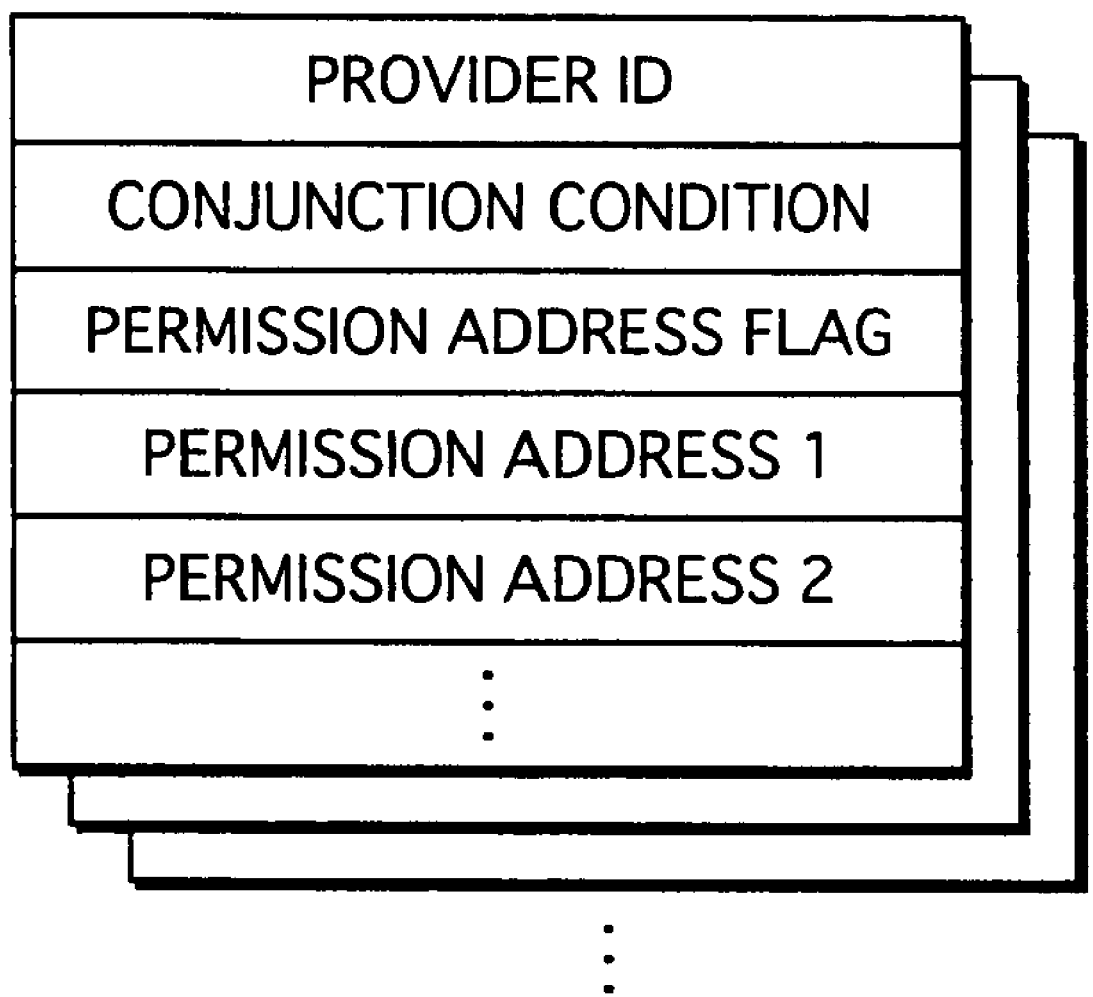
FIG. 10 shows a structure of provider condition information.

FIG. 10 shows a structure of provider condition information stored in the condition information storage unit 13. Each piece of the provider condition information is data including a "provider ID" for uniquely identifying a provider of a content, in addition to the condition information recorded in the BD-ROM in the first embodiment.

A provider ID is recorded in a lead-in area, which is the innermost track of a BD-ROM according to the second embodiment. To perform playback control processing, the playback device 200 acquires the provider ID recorded in the lead-in area of the BD-ROM. The conjunction condition acquisition unit 10 acquires, from the condition information storage unit 13, a piece of the provider condition information corresponding to the acquired provider ID.

The acquired piece of the provider condition information is used instead of the condition information in the first embodiment. This enables restriction of supplier sources of unauthorized applications using a different setting for each provider, in the playback control processing shown in FIG. 6. Furthermore, with respect to a content provided by a provider identified by a provider ID having no corresponding provider condition information, supplier sources of unauthorized applications can be restricted by using a setting that is common in a plurality of providers using the region information.

According to the second embodiment as described above, a provider can uniformly restrict supplier sources of unauthorized applications to be used for playback in conjunction with contents distributed therefrom with no need to record condition information for each BD-ROM.

(Third Embodiment)

The playback device 200 according to the first embodiment estimates an application region code of an unauthorized application to control conjunction playback, when playing back contents in accordance with a user operation to the remote control 300. Compared with this, a playback device 200 according to a third embodiment estimates an application region code of an unauthorized application when acquiring the unauthorized application, to judge whether conjunction playback is permitted.

The network device 2 accesses an address input by the user or an address recorded in the BD-ROM 100 to acquire an unauthorized application. If an access destination is a supplier server of the unauthorized application, the network device 2 downloads the application. However, depending on a setting of a server that is the access destination, there is a case where the network device 2 is requested to jump to another address and receives the application from a server that is the jump destination.

In such a case, there is a possibility that playback of a content in conjunction with execution of the unauthorized application is restricted contrary to the user's anticipation despite that a ccTLD of an address input by the user or a ccTLD of an address recorded in the BD-ROM 100 show a country or region where supply of the unauthorized application is permitted. This is because a ccTLD of an address of the jump destination is a country or region where supply of the unauthorized application is not permitted.

In view of this problem, the playback device 200 according to the third embodiment performs connection change processing for checking with the user about whether to change an access destination before the access destination jumps to another address.

Figure 11:
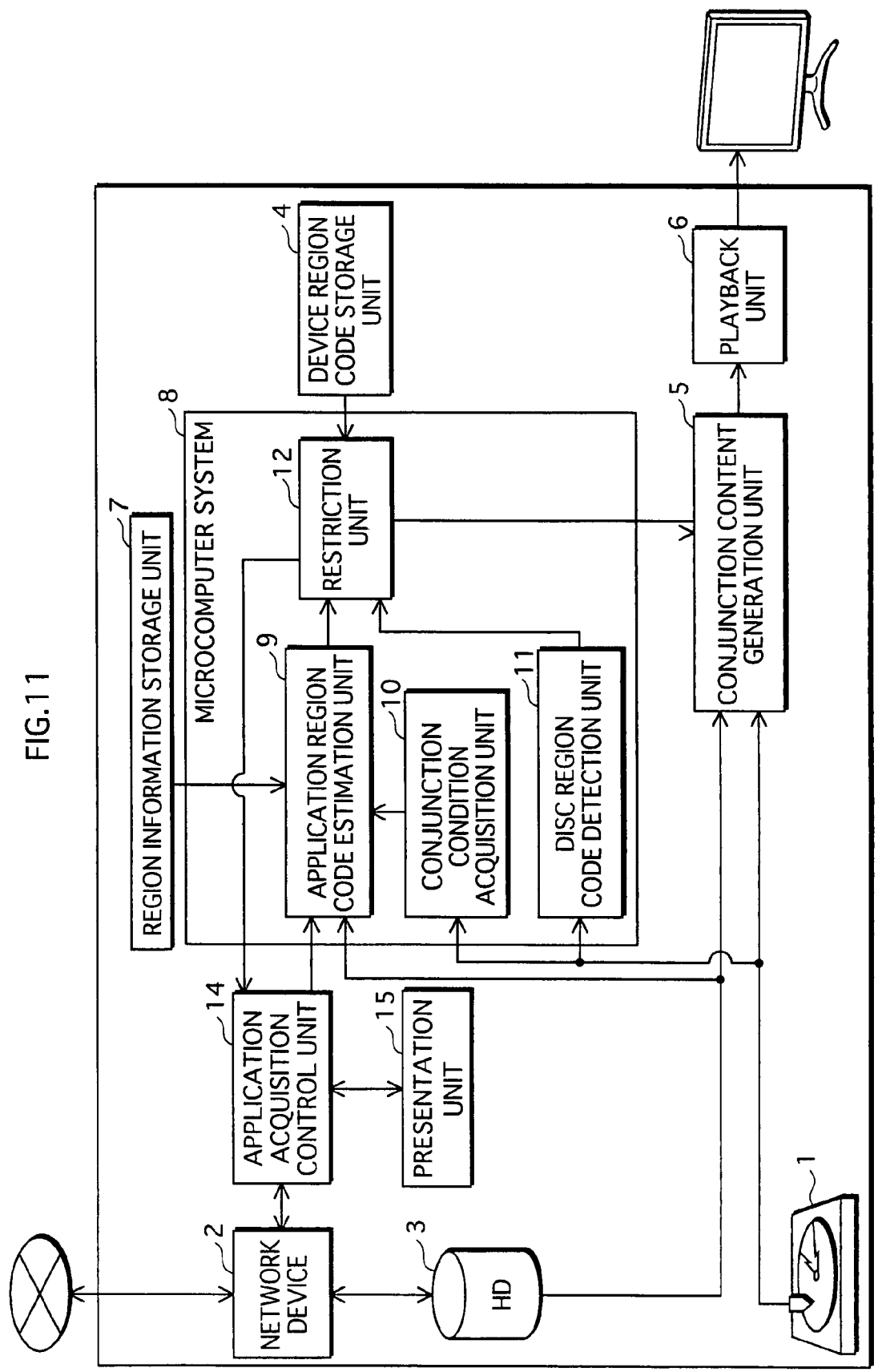
FIG. 11 shows an internal structure of a playback device 200 according to a third embodiment.

FIG. 11 shows an internal structure of the playback device 200 according to the third embodiment. The playback device 200 according to the third embodiment includes an application acquisition control unit 14 and a presentation unit 15 in addition to the structure shown in FIG. 3.

The application acquisition control unit 14 monitors the network device 2 accessing the network. If an access destination is going to jump to another address, the application acquisition control unit 14 performs the connection change processing.

The presentation unit 15 generates a warning message for warning that the access destination is going to jump to another address, and outputs the generated warning message to the TV 400.

This completes the description of the structure of the playback device 200 according to the third embodiment.

Figure 12:
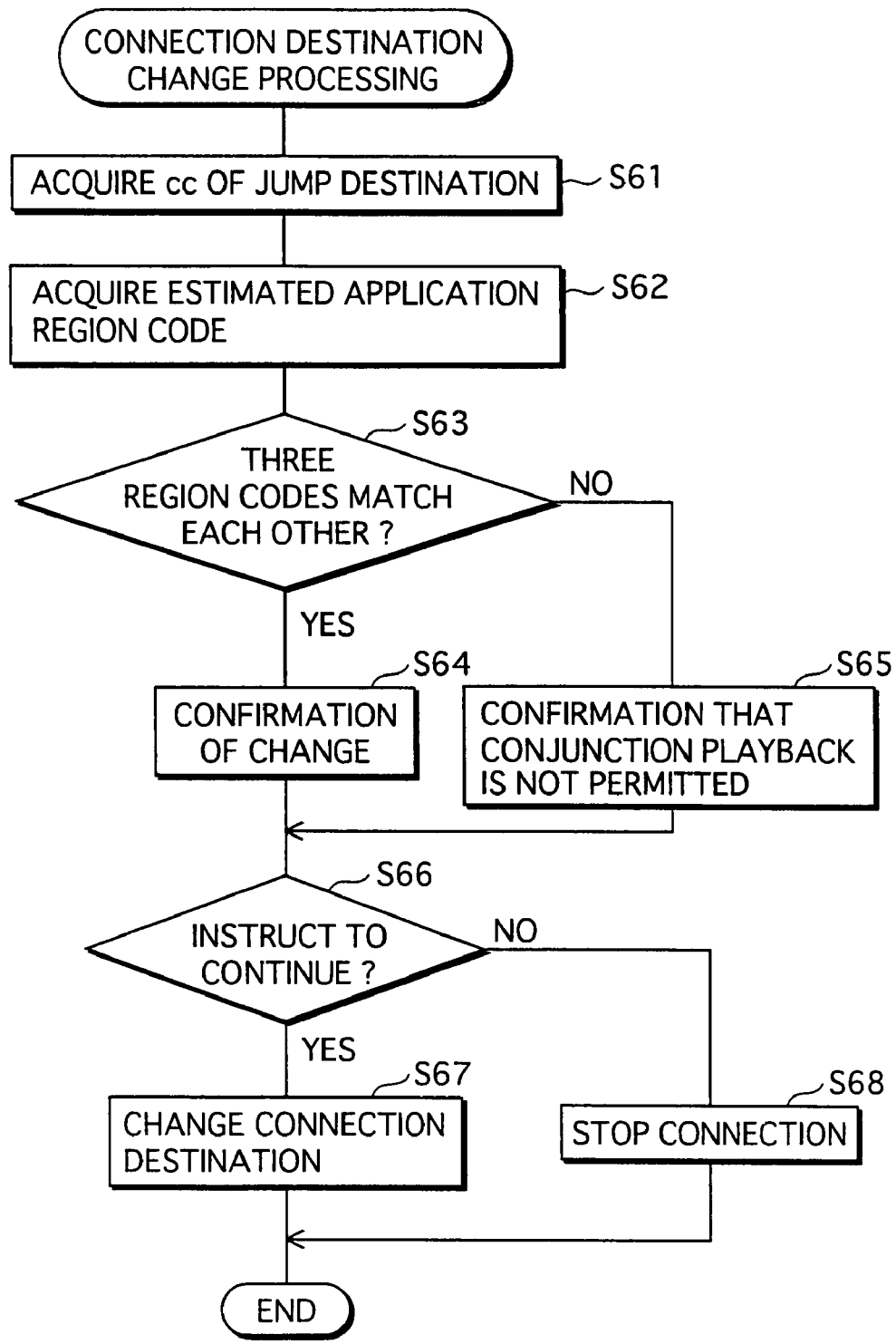
FIG. 12 is a flow chart showing a procedure of connection destination change processing according to the third embodiment.

Next, the following describes in detail the connection destination change processing performed by the application acquisition control unit 14. FIG. 12 is a flow chart showing a procedure of the connection destination change processing.

Figure 13A:
FIG. 13 shows an example of an alarm display showing that a connection destination is changed when application is acquired.
Figure 13B:
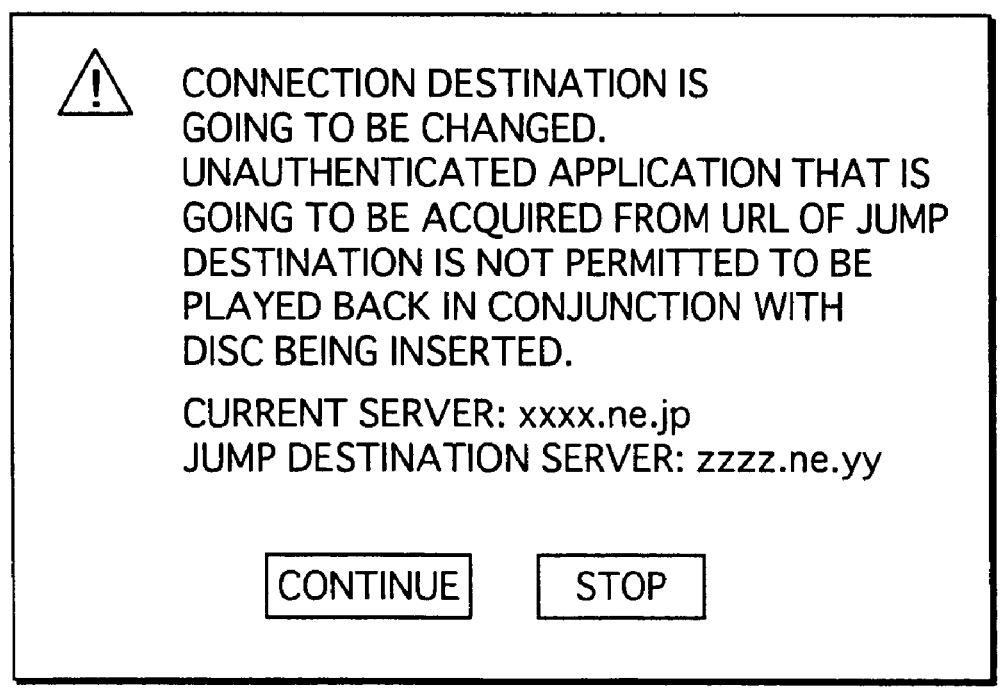

In the connection destination change processing, if receiving an instruction to jump from the currently accessed server to another address, the application acquisition control unit 14 performs processing in Steps S61 to S63 to output either of warning messages shown in FIG. 13A and FIG. 13B to a screen. In accordance with a user operation in response to the output warning message, the application acquisition control unit 14 causes the network device 2 to change the access destination (Step S67), or causes the network device 2 to stop accessing the network (Step S68).

In Step S61, if receiving an instruction to jump from the currently accessed server to another address, the application acquisition control unit 14 acquires an address designated as a jump destination from the network device 2. In Step S62, the application acquisition control unit 14 performs the region code estimation processing using the acquired address to estimate an application region code.

In Step S63, the application acquisition control unit 14 judges whether the estimated application region code matches the disc region code and the device region code. If the region codes match each other (Step S63: Yes), the application acquisition control unit 14 causes the presentation unit 15 to output the warning message shown in FIG. 13A, and waits for a user operation instructing whether to change the access destination (Step S64). This enables prevention of the user from unwittingly accessing an unknown server.

On the other hand, if the region codes do not match each other (Step S63: No), the application acquisition control unit 14 causes the presentation unit 15 to output the warning message shown in FIG. 13B, and waits for a user operation instructing whether to acquire the unauthorized application (Step S65). This enables the application acquisition control unit 14 to check with the user about whether to acquire the unauthorized application prohibited from being used for conjunction playback, before actually acquiring the unauthorized application.

In Step S66, the application acquisition control unit 14 judges whether each of the user operations in response to the warning messages instructs to continue accessing the network or to stop accessing the network.

According to the third embodiment as described above, whether conjunction is permitted is judged using an address of a jump destination before actually jumping to the address. This exhibits an effect that a useless network access is suppressed. Also, the user can know whether conjunction is permitted before acquiring an application. This can save the user from troubles of acquiring a useless unauthorized application that is not permitted to be played back in conjunction with a content.

Furthermore, there are possibilities that an application acquired from an unintended server is an application that performs a malicious act such as a computer virus, and careless connection to an unknown address leads to an unexpected damage such as phising. According to the third embodiment, an address of a jump destination is presented before jumping to the address. This presentation warns the user, and can prevent occurrence of the above-mentioned damage.

(Fourth Embodiment)

Conventionally, the following business method has been adopted in sales of contents recorded in optical discs. First, in the English-speaking world, optical discs each having assigned thereto a region code corresponding to the English-speaking world are distributed. Then, in the non-English-speaking world, the optical discs each having assigned thereto a region code corresponding to the non-English-speaking world are distributed after the distribution in the English-speaking world. A fourth embodiment relates to the business method in which a time when authorized applications are distributed is changed depending on regions.

If a time when an authorized application is distributed is changed depending on regions, a supplier server supplies the authorized application having attached thereto region codes assigned to regions where a release day of the authorized application has passed. For example, assume an authorized application that has been already released in April 1st in U.S.A. and is scheduled to be released in May 1st in Japan. If the authorized application is downloaded by the end of April, the authorized application has attached thereto only the region code assigned to U.S.A. "1". If the authorized application is downloaded on May 1st or later, the authorized application has attached thereto both of the region code assigned to U.S.A. "1" and the region code assigned to Japan "2".

If playback of a content in conjunction with execution of an authorized application is prohibited, a playback device 200 according to the fourth embodiment re-acquires the authorized application when the content is played back next time. Due to this, if the content is played back after the release day of the authorized application, the content is played back in conjunction with execution of the authorized application.

Figure 14:
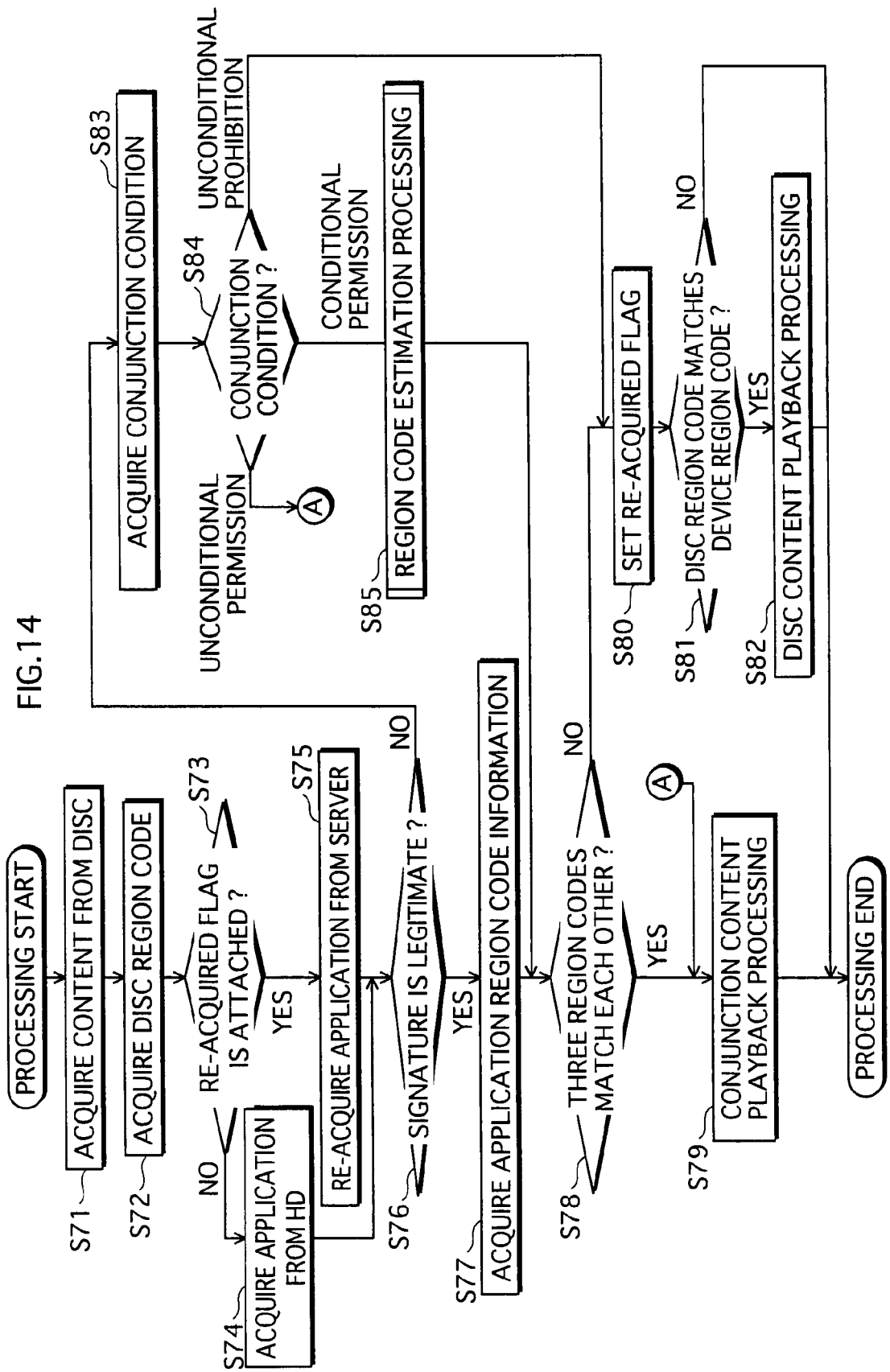
FIG. 14 is a flow chart showing a procedure of playback control processing according to a fourth embodiment.

FIG. 14 is a flow chart showing a procedure of playback control processing according to the fourth embodiment. The flow chart shown in FIG. 14 includes the processing in Steps S73, S75, and S80 in addition to the processing in the flow chart shown in FIG. 5.

In Step S3 in the flow chart shown in FIG. 5, the application read from the local storage 3 is acquired as an application to be used for conjunction playback.

In the fourth embodiment, in Step S73, the application acquisition control unit 14 judges whether a "re-acquisition flag" which is described later is attached to the application read from the local storage 3. If judging negatively (Step S73: No), the application acquisition control unit 14 acquires the application read from the local storage 3 in the same way as the flow chart shown in FIG. 5 (Step S74). If judging affirmatively (Step S73: Yes), the application acquisition control unit 14 instructs the network device 2 to re-acquire the application, and the network device 2 downloads the application from the supplier server (Step S75). If a release day of the application downloaded here has not passed in a predetermined region shown by a device region code/a disc region code, the application is the same as the application recorded in the local storage 3. If the release day has passed in the predetermined region, the application is an application to which the region code of the predetermined region is added to the application recorded in the local storage 3.

The "re-acquisition flag" is information instructing to re-acquire the application. If the application region code, the disc region code, and the device region code do not match each other and therefore conjunction playback is prohibited in Step S78: No, the "re-acquisition flag" is added to the application recorded in the local storage 3 in Step S80.

According to the fourth embodiment as described above, even if playback of a content in conjunction with an authorized application is restricted because the authorized application has been acquired before a release day thereof, the authorized application is re-acquired when the content is played back next time. Due to this, if the content is played back next time after the release day, the user can enjoy playback of the content in conjunction with the authorized application without being conscious of re-acquisition of the authorized application. Therefore, there is no need to confirm that a release day of an authorized application has passed and operate the playback device 200 in order to re-acquire the authorized application. This can save the user from troubles.

(Modifications)

While the present invention has been described based on the above embodiments, the present invention is by no means limited to the above embodiments. The present invention also includes the following cases.

(1) The present invention may be a playback method shown by the procedure flow charts described in the above embodiments. Also, the present invention may be a computer program that realizes the method by a computer, or may be a digital signal composed of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored in the recording medium.

Furthermore, the present invention may be the computer program or the digital signal transmitted via an electric communication line, a wireless or wired communication line, a network such as the Internet, data broadcasting, and the like.

Furthermore, the program or the digital signal may be executed by other independent computer system, by transferring the program or the digital signal to the recording medium, or by transferring the program or the digital signal via the network or the like.

Furthermore, the present invention may be a computer system that includes a microprocessor and a memory, the memory storing the computer program, and the microprocessor operating in accordance with the computer program.

(2) The present invention may be embodied as an LSI that controls the playback device. Such an LSI may be realized by integrating functional blocks of the network device 2, the device region code storage unit 4, the conjunction content generation unit 5, the playback unit 6, the region information storage unit 7, the microcomputer system 8 shown in FIG. 3, the condition information storage unit 13 shown in FIG. 9, the application acquisition control unit 14 and the presentation unit 15 shown in FIG. 11. These functional blocks may be individually constructed in chips, or partly or wholly constructed in one chip.

Alternatively, a dedicated circuit or a general-purpose processor may be used for circuit integration instead of the LSI. An FPGA (Field Programmable Gate Array) programmable after the LSI has been manufactured and a reconfigurable processor capable of reconfiguring the connections and settings of circuit cells within the LSI may be employed. Furthermore, if integration technology that replaces large-scale integration becomes available as a result of advances in semiconductor technology or the advent of derivative technology, the integration of the functional blocks may naturally be performed using this technology. The application of biotechnology or the like in this area is also a possibility.

(3) In all the above embodiments, the region information stored in the playback device is registered by the manufacturer at manufacturing of the playback device. Instead of this, the region information may be set by the user.

(4) In the first and second embodiments, the two cases are described, including a case in which conjunction condition for playback in conjunction with an unauthorized application is recorded in the optical disc and a case the conjunction condition is recorded in the playback device. However, the conjunction condition may be recorded in not only either one of the optical disc and the playback device, but also both of the optical disc and the playback device.

In such a case, conjunction playback may be restricted in accordance with either one of the conjunction conditions recorded in the optical disc and the playback device. Also, conjunction playback may be permitted only if both of the conjunction conditions recorded in the optical disc and the playback device are satisfied.

(5) In the present invention, information showing a location of a server may be information designating servers one by one, such as the permission address recorded in the optical disc in the above embodiments. Also, the information may be information designating a plurality of servers depending on an attribute, such as the region information stored in the playback device in the above embodiments. The information may be recorded in either one of the optical disc and the playback device. For example, the region information applied for each content may be recorded in the optical disc. Also, a permission address flexibly applied to all the contents may be recorded in the playback device.

(6) In all the above embodiments, a server permitted as a supplier source of an unauthorized application and a country or region permitted as a country or region of the supplier source of the unauthorized application are shown using a permission address and the region information. Alternatively, other information may be employed as long as being information limiting to a server permitted as the supplier source of the unauthorized application. For example, a non-permission address showing an address of a server prohibited from supplying an unauthorized application and prohibited region information showing a country or region prohibited from being supplied an unauthorized application may be employed.

(7) In all the above embodiments, a region code is recorded in the lead-in area of the BD-ROM. This is in order to ensure the compatibility with the DVD. The region code may be recorded in another area.

Also, if a plurality of contents is recorded in the BD-ROM, a region code corresponding to each of the contents may be recorded. In such a case, playback of the contents in conjunction with an application is restricted for each of the contents.

(8) In all the above embodiments, the BD-ROMs have been used as the optical disc according to the present invention. However, the characteristics of the optical disc are not dependent on the physical properties of BD-ROMs, and can be applied to any recording medium. For example, an optical disc such as a DVD-ROM, a DVD-RAM, a DVD-RW, a DVD-R, a DVD+RW, a DVD+R, a CD-R, and a CD-RW, a magneto-optical disc such as a PD and an MO may be employed. Also, a semiconductor memory card such as a compact flash card, a Smartmedia, a memory stick, a multi-media card, and a PCM-CIA card may be employed. Furthermore, a magnetic recording disc such as a flexible disk, a SuperDisk, a Zip, and a Click!, may be employed. Furthermore, a removable hard disk drives such as an ORB, a Jaz, a SparQ, a SyJet, an EZFley, and a Microdrive may be employed. Moreover, a built-in hard disk may be employed.

(9) In all the above embodiments, the playback device according to the present invention stores therein a region code assigned thereto such that the region code cannot be rewritten. Instead of this, the playback device may rewrite the region code depending on a state of the playback device.

For example, the playback device may store, as a device region code, an IP address of the playback device acquired from a DHCP server or a region code estimated based on geographical information acquired using a GPS and so on. Alternatively, the playback device may store, as a device region code, a region code estimated based on a language selected as a subtitle in a content previously played back or a language used for a menu screen.

(10) The present invention includes any combination of the above embodiments and modifications.

Industrial Applicability

The present invention is applicable to a playback device that plays back a content recorded in an optical disc in conjunction with an application.

The invention claimed is:

1. A playback device that performs playback of a content recorded in an optical disc in conjunction with execution of an application program supplied by a server, the playback device comprising:

a storage unit operable to acquire the application program from the server, and store the acquired application in a local storage;

a first judgment unit operable to judge whether the application program is legitimate based on digital signature information supplied by the server;

an acquisition unit operable, if the first judgment unit judges negatively, to acquire conjunction condition information from the optical disc, the conjunction condition information showing any one of (i) unconditional permission for the conjunction, (ii) conditional permission for the conjunction, and (iii) unconditional prohibition for the conjunction;

a second judgment unit operable, if the acquired conjunction condition information shows the conditional permission, to judge whether the application program satisfies a permission condition for the conjunction;

a restriction unit operable, if the conjunction condition information shows the conditional permission and the second judgment unit judges negatively, to restrict the playback of the content in conjunction with the execution of the application program;

a detection unit operable to detect a region code from the optical disc; and an estimation unit operable to estimate a region code based on a source of the application program, wherein if a region code assigned to the playback device, the detected region code, and the estimated region code do not match each other, the second judgment unit judges negatively, wherein the restriction unit permits the playback of the content by merging the content with the application program, and wherein the restriction unit restricts the playback of the content by not merging the content with the application program.

2. The playback device of claim 1,
wherein if the first judgment unit judges affirmatively, the estimation unit uses a region code assigned to the application program as an estimation result.

3. The playback device of claim 1,
wherein the application program has assigned thereto a region code by the server, in accordance with a time when the application program is supplied, and
wherein the playback device further comprises
a re-acquisition unit operable, if the restriction unit restricts the playback of the content in conjunction with the execution of the application program, to re-acquire the application program from the server when playing back the content next time.

4. The playback device of claim 1,
wherein the source is a location of the server.

5. The playback device of claim 4 further comprising
a permission information storage unit that stores permission information showing locations permitted as locations of suppliers of the application program,
wherein if the location of the server is included in the permitted locations, the estimation unit uses a region code that matches either one of (i) the region code detected from the optical disc and (ii) the region code assigned to the playback device as an estimation result.

6. The playback device of claim 5,
wherein the permission information shows the permitted locations using region names.

7. The playback device of claim 5,
wherein the permission information shows the permitted locations using addresses on a network.

8. The playback device of claim 4,
wherein the optical disc has recorded therein permission information showing locations permitted as locations of suppliers of the application program,
wherein the playback device further comprises
an information detection unit operable to detect the permission information from the optical disc, and
wherein if the location of the server is included in the permitted locations, the estimation unit uses a region code that matches either one of (i) the detected region code and (ii) the region code assigned to the playback device as an estimation result.

9. The playback device of claim 8,
wherein the permission information shows the permitted locations using region names.

10. The playback device of claim 8,
wherein the permission information shows the permitted locations using addresses on a network.

11. The playback device of claim 4,
wherein the estimation unit uses a region code corresponding to a country shown by a country code Top Level Domain included in a domain name of the server as an estimation result.

12. The playback device of claim 11,
wherein each time a connection destination for receiving the application program is changed to an address of another country code Top Level Domain, the estimation unit performs the estimation.

13. An integrated circuit that controls a playback device that performs playback of a content recorded in an optical disc in conjunction with execution of an application program supplied by a server, the integrated circuit comprising:

a storage unit operable to acquire the application program from the server, and store the acquired application program in a local storage;

a first judgment unit operable to judge whether the application program is legitimate based on digital signature information supplied by the server;

as acquisition unit operable, if the first judgment unit judges negatively, to acquire conjunction condition information from the optical disc, the conjunction condition information showing any one of (i) unconditional permission for the conjunction, (ii) conditional permission for the conjunction, and (iii) unconditional prohibition for the conjunction;

a second judgment unit operable, if the acquired conjunction condition information shows the conditional permission, to judge whether the application program satisfies a permission condition for the conjunction;

a restriction unit operable, if the conjunction condition information shows the conditional permission and the second judgment unit judges negatively, to restrict the playback of the content in conjunction with the execution of the application program;

a detection unit operable to detect a region code from the optical disc; and an estimation unit operable to estimate a region code based on a source of the application program, wherein if a region code assigned to the playback device, the detected region code, and the estimated region code do not match each other, the second judgment unit judges negatively, wherein the restriction unit permits the playback of the content by merging the content with the application program, and wherein the restriction unit restricts the playback of the content by not merging the content with the application program.

14. A playback method for performing, in a playback device having a region code assigned thereto, playback of a content recorded in an optical disc in conjunction with execution of an application program supplied by a server, the playback method comprising:

acquiring the application program from the server, and storing the acquired application program in a local storage;

reading, using a drive device, conjunction condition information from the optical disc, the conjunction condition information showing any one of (i) unconditional permission for the conjunction, (ii) conditional permission for the conjunction, and (iii) unconditional prohibition for the conjunction;

judging whether the application program is legitimate based on digital signature information supplied by the server, and if judging negatively and the acquired conjunction condition information shows the conditional permission, further judging whether the application program satisfies a permission condition for the conjunction;

restricting, if the conjunction condition information shows the conditional permission and the judgment result in negative, the playback of the content in conjunction with the execution of the application program;

reading, using the drive device, a region code from the optical disc; and estimating a region code based on a source of the application program, wherein if a region code assigned to the playback device, the read region code, and the estimated region code do not match each other, the judgment result in negative, wherein the playback of the content is permitted by merging the content with the application program, and wherein the playback of the content is restricted by not merging the content with the application program.

15. A non-transitory computer readable recording medium having recorded thereon a playback program for performing, in a playback device having a region code assigned thereto, playback of a content recorded in an optical disc in conjunction with execution of an application program supplied by a server, wherein, when executed, the playback program causes the playback device to perform a method comprising:

acquiring the application program from the server, and storing the acquired application program in a local storage;

judging whether the application program is legitimate based on digital signature information supplied by the server;

acquiring, if the judgment result is negative, conjunction condition information from the optical disc, the conjunction condition information showing any one of (i) unconditional permission for the conjunction, (ii) conditional permission for the conjunction, and (iii) unconditional prohibition for the conjunction;

judging, if the acquired conjunction condition information shows the conditional permission, whether the application program satisfies a permission condition for the conjunction;

restricting, if the conjunction condition information shows the conditional permission and the judgment result is negative, the playback of the content in conjunction with the execution of the application program;

detecting a region code from the optical disc; and estimating a region code based on a source of the application program, wherein if a region code assigned to the playback device, the detected region code, and the estimated region code do not match each other, the judgment result is negative, wherein the playback of the content is permitted by merging the content with the application program, and wherein the playback of the content is restricted by not merging the content with the application program.

* * * * *